(12) United States Patent
Azuma

(10) Patent No.: US 7,127,417 B2
(45) Date of Patent: Oct. 24, 2006

(54) VOICE SIGNATURE TRANSACTION SYSTEM AND METHOD

(75) Inventor: Tomihiko Azuma, Tokyo (JP)

(73) Assignee: NEC Corporation, Tokyo (JP)

( * ) Notice: Subject to any disclaimer, the term of this patent is extended or adjusted under 35 U.S.C. 154(b) by 786 days.

(21) Appl. No.: 09/884,940

(22) Filed: Jun. 21, 2001

(65) Prior Publication Data

US 2002/0010646 A1  Jan. 24, 2002

(30) Foreign Application Priority Data

Jun. 30, 2000  (JP) ............................. 2000-198873

(51) Int. Cl.
*G06Q 30/00* (2006.01)
(52) U.S. Cl. .......................................... 705/26; 705/27
(58) Field of Classification Search .................. 705/26, 705/27, 37
See application file for complete search history.

(56) References Cited

U.S. PATENT DOCUMENTS

| | | | | |
|---|---|---|---|---|
| 5,915,019 | A | * | 6/1999 | Ginter et al. .................. 705/54 |
| 5,940,476 | A | * | 8/1999 | Morganstein et al. ..... 379/88.02 |
| 5,970,143 | A | * | 10/1999 | Schneier et al. ............ 713/181 |
| 6,169,787 | B1 | | 1/2001 | Shimada et al. |
| 6,260,024 | B1 | * | 7/2001 | Shkedy ......................... 705/37 |
| 6,445,775 | B1 | * | 9/2002 | Morganstein et al. ..... 379/88.02 |
| 2003/0069844 | A1 | * | 4/2003 | Koren ........................... 705/40 |

FOREIGN PATENT DOCUMENTS

| | | |
|---|---|---|
| EP | EP 598469 A2 * | 5/1994 |
| JP | 8-96056 | 4/1996 |
| JP | 10-21305 | 1/1998 |
| JP | 10-116249 | 5/1998 |
| JP | 11-3383 | 1/1999 |
| JP | 11-353399 | 12/1999 |

OTHER PUBLICATIONS

"VeriSign Unveils New Suite of Digital Validation Services." Apr. 4, 2000, PR Newswire, (pp. 1-4).*
Libbey, Mary Beth, & Giesen, Lauri. "Fraud-Busting Takes a Back Seat." Dec. 1991. Credit Card Management, (p. 1).*
"Nuance Releases First Natural Language Speech Regonition & Speaker Verification Products for Brazilian Market." Mar. 30, 1999, PR Newswire, (pp. 1-3).*
Carlsen, Clifford. "Visa plays a new card: Venture funds." Jun. 19, 1998, San Francisco Business Times, (p. 1).*
"Motorola and VeriSign Unveil Plans to Deliver Secure E-Commerce To Wireless Market." Jan. 18, 2000, PR Newswire, (pp. 1-3).*
"VeriSign Introduces New Technology to Enable Network-Based Authentication, Digital Signatures and Data Privacy." may 31, 2000, PR Newswire, (pp. 1-3).*
"Periphonics Partners with T-NETIX to Enhance Automated Transaction Processing Services with Voice Verfiication Capabilities", PR newswire; Jun. 25, 1998.*
Article—Computer Telephony, Mar. 2000, vol. 3, No. 4, pp. 19-33.

* cited by examiner

*Primary Examiner*—Jeffrey A. Smith
(74) *Attorney, Agent, or Firm*—Foley & Lardner LLP

(57) ABSTRACT

A voice signature transaction system for use in electronic commerce comprises user terminals, a server, and a data network. The server receives order data from a user, allocates an order ID to the order data, requests the user to enter, via voice, a plurality of signatures such as a name, ID, and so on, checks if the registered name and ID match the name and ID included in the voice data, and stores the voice data received from the user.

25 Claims, 3 Drawing Sheets

VOICE SIGNATURE TRANSACTION SYSTEM AND METHOD

FIELD OF THE INVENTION

The present invention relates to a transaction system and a transaction method in which a product or service transaction is conducted by a user terminal used by a user, a server used by a product or service server, and a data network connecting the user and the server. More particularly, the present invention relates to a transaction system and a transaction method in which a signature is added to a user's (customer's) order through a plurality of voice data units.

BACKGROUND OF THE INVENTION

To prevent a user's (customer's) rejection of payment and non-recognition of an order, the technology for adding a user's digital signature to an order is used today in an electronic commerce on the Internet.

A private key stored, for example, in a smart card is used as a digital signature. However, using such a private key as a digital signature requires the user terminal to have a special unit such as a smart card reader.

Also, electronic commerce on the Internet is increasingly targeted not only at personal computers but also at cellular phones.

SUMMARY OF THE DISCLOSURE

However, the conventional technology has the problems described below. That is, as cellular phones become more popular and the volume of electronic commerce rapidly increases, the problem of user's rejection of payment or the non-recognition of orders occurs more frequently. This is because using a conventional digital signature through the use of a smart card requires a user terminal to have a special unit. However, it is not practical for cellular phones, which are widely used today, to have such a special unit.

It is a first object of the present invention to provide a voice signature transaction system and a voice signature transaction method capable of preventing troubles involved in electronic commerce on cellular phones such as the user's (customer's) rejection of payment or non-recognition of an order.

It is a second object of the present invention to provide a voice signature transaction system and a voice signature transaction method that do not require a user's terminal to have a special unit.

According to a first aspect of the present invention, there is provided a voice signature transaction system comprising a user terminal used by a user, a server used by a person providing products or services, and a data network connecting the user terminal and the server for conducting a product or service transaction, wherein (A) the user terminal comprises a voice input unit for inputting voice data, and wherein (B) the server comprises a sending/receiving unit, an allocating unit, a storage unit, and a checking unit, wherein (B1) the sending/receiving unit (B11) sends product and service transaction information to the user terminal when accessed by the user terminal, (B12) receives order data including data on a product or a service and a user name, the product or service being specified on the user terminal receiving the transaction information and being specified from products and services included in the transaction information, (B13) sends order ID request information to the user terminal, the order ID request information requesting a signature of an order ID of the order data via voice, the order ID being allocated by the allocating unit in response to the order data, (B14) receives order ID voice data that is input, via voice, on the user terminal receiving the order ID request information, (B15) sends name request information to the user terminal when the order ID included in the received order ID voice data matches the allocated order ID, the name request information requesting to input, via voice, a signature of a name of a user who has placed the order, (B16) receives name voice data that is input, via voice, on the user terminal receiving the name request information, and (B17) sends acceptance information to the user terminal when the name included in the received name voice data matches the name included in the order data, the acceptance information indicating that the order data, the order ID voice data, and the name voice data have been accepted, wherein (B2) the allocating unit allocates the order ID to the order data, wherein (B3) the storage unit stores the order data as well as the order ID voice data and the name voice data that are related to the order data and stores the transaction information, and wherein (B4) the checking unit (B41) checks if the order ID included in the received order ID voice data matches the allocated order ID, and (B42) checks if the name included in the received name voice data matches the name included in the order data.

Preferably, in the voice signature transaction system, (B1) the sending/receiving unit of the server further sends date/time request information to the user terminal when the name included in the received name voice data matches the name included in the order data, the date/time request information requesting to input, via voice, an order date/time, and receives date/time voice data that is input, via voice, on the user terminal receiving the date/time request information, and (B3) the storage unit of the server further stores the date/time voice data related to the order data.

Preferably, in the voice signature transaction system, (B4) the checking unit of the server further checks if a voiceprint of the received order ID voice data matches a voiceprint of the received name voice data and/or date/time voice data, and (B1) the sending/receiving unit of the server further sends the acceptance information to the user terminal when the voiceprint of the received order ID voice data matches the voiceprint of the received name voice data and/or date/time voice data.

Preferably, in the voice signature transaction system, the sending/receiving unit of the server sends the order ID request information or the name request information again when the checking unit did not find a match in the order IDs, in the names, or in the voiceprints; and information indicating that the order data is not accepted when the checking unit did not find a match in the order IDs, in the names, or in the voiceprints after the order ID request information or the name request information is sent a specified number of times.

Preferably, in the voice signature transaction system, the server further comprises output unit for outputting a voice of the voice signature data stored in the storage unit.

Preferably, in the voice signature transaction system, the user terminal is a cellular phone and the data network includes a wireless base station capable of making a wireless connection to the cellular phone.

According to a second aspect of the present invention, there is provided a voice signature transaction method for use in a system comprising a user terminal used by a user, a server used by a person providing products or services, and a data network connecting the user terminal and the server for conducting a product or service transaction, the method comprising the steps by the server of sending product and service transaction information to the user terminal when accessed by the user terminal; receiving order data including data on a product or a service and a user name, the product or service being specified on the user terminal receiving the transaction information and being specified from products and services included in the transaction information; storing the received order data; allocating an order ID to the order data in response to the order data; sending order ID request information to the user terminal, the order ID request information requesting a signature of the order ID of the order data via voice; receiving order ID voice data that is input, via voice, on the user terminal receiving the order ID request information; storing the order ID voice data related to the order data; checking if the received order ID voice data matches the allocated order ID; sending name request information to the user terminal when the order ID included in the received order ID voice data matches the allocated order ID, the name request information requesting to input, via voice, a signature of a name of a user who has placed the order; receiving name voice data that is input, via voice, on the user terminal receiving the name request information; checking if the name included in the received name voice data matches the name included in the order data; and sending acceptance information to the user terminal when the name included in the received name voice data matches the name included in the order data, the acceptance information indicating that the order data, the order ID voice data, and the name voice data have been accepted.

According to a third aspect of the present invention, there is provided a computer-readable program for use in a system comprising a user terminal used by a user, a server used by a person providing products or services, and a data network connecting the user terminal and the server for conducting a product or service transaction, the program causing the server to send product and service transaction information to the user terminal when accessed by the user terminal; receive order data including data on a product or a service and a user name, the product or service being specified on the user terminal receiving the transaction information and being specified from products and services included in the transaction information; store the received order data; allocate an order ID to the order data in response to the order data; send order ID request information to the user terminal, the order ID request information requesting a signature of the order ID of the order data via voice; receive order ID voice data that is input, via voice, on the user terminal receiving the order ID request information; store the order ID voice data related to the order data; check if the received order ID voice data matches the allocated order ID; send name request information to the user terminal when the order ID included in the received order ID voice data matches the allocated order ID, the name request information requesting to input, via voice, a signature of a name of a user who has placed the order; receive name voice data that is input, via voice, on the user terminal receiving the name request information; check if the name included in the received name voice data matches the name included in the order data; and send acceptance information to the user terminal when the name included in the received name voice data matches the name included in the order data, the acceptance information indicating that the order data, the order ID voice data, and the name voice data have been accepted.

The program may be carried on or stored by a medium, which is computer-readable. The medium may be static or dynamic, the latter comprising, e. g., also a carrier wave or transmission system in general. e. g., a communication network system.

PREFERRED EMBODIMENTS OF THE INVENTION

A voice signature transaction system comprises a user terminal used by a user, a server used by a person providing products or services, and a data network connecting the user terminal and the server for conducting a product or service transaction, wherein (A) the user terminal comprises voice input unit for inputting voice data, and wherein (B) the server comprises sending/receiving unit, allocating unit, storage unit, and checking unit, wherein (B1) the sending/receiving unit (B11) sends product and service transaction information to the user terminal when accessed by the user terminal, (B12) receives order data including data on a product or a service and a user name, the product or service being specified on the user terminal receiving the transaction information and being specified from products and services included in the transaction information, (B13) sends order ID request information to the user terminal, the order ID request information requesting a signature of an order ID of the order data via voice, the order ID being allocated by the allocating unit in response to the order data, (B14) receives order ID voice data that is input, via voice, on the user terminal receiving the order ID request information, (B15) sends name request information to the user terminal when the order ID included in the received order ID voice data matches the allocated order ID, the name request information requesting to input, via voice, a signature of a name of a user who has placed the order, (B16) receives name voice data that is input, via voice, on the user terminal receiving the name request information, and (B17) sends acceptance information to the user terminal when the name included in the received name voice data matches the name included in the order data, the acceptance information indicating that the order data, the order ID voice data, and the name voice data have been accepted, wherein (B2) the allocating unit allocates the order ID to the order data, wherein (B3) the storage unit stores the order data as well as the order ID voice data and the name voice data that are related to the order data and stores the transaction information, and wherein (B4) the checking unit (B41) checks if the order ID included in the received order ID voice data matches the allocated order ID, and (B42) checks if the name included in the received name voice data matches the name included in the order data. If, after the person providing products or services processes the order, the user (customer) rejects to pay or does not recognize that he or she has placed the order, the voice data saved in the server as the user signature may be reproduced to request the user to confirm the order. If the user still rejects to pay, the person providing products or services may use a voiceprint analyzer, as necessary, to analyze the voiceprint of the voice data saved in the server or ask a specialist to check the voiceprint.

Figure 1:
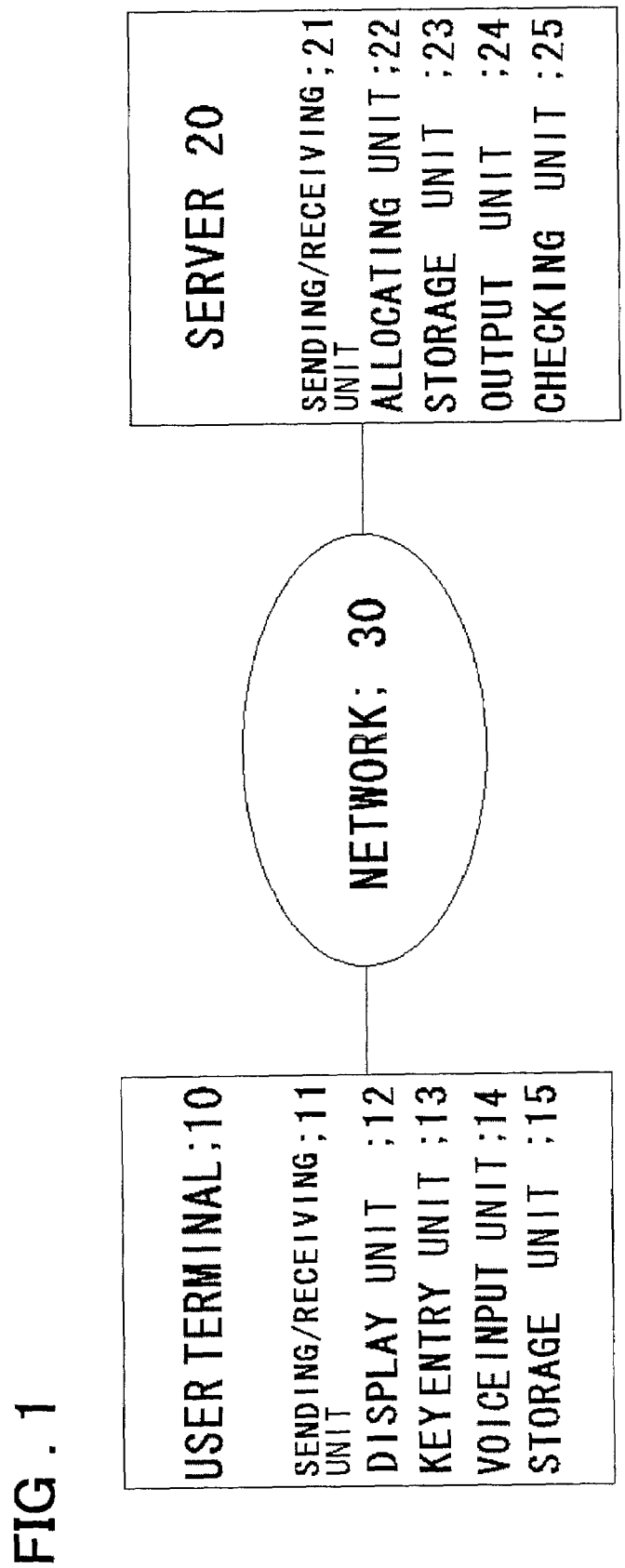
FIG. 1 is a block diagram schematically showing the configuration of a voice signature transaction system in an embodiment of the present invention.

An embodiment of the present invention will now be described with reference to the drawings. FIG. 1 is a block diagram schematically showing the configuration of a voice signature transaction system in an embodiment of the present invention. The voice signature transaction system comprises a user terminal 10, a server 20, and a communication network 30.

The user terminal 10, a terminal used by a user who is a customer, is a cellular phone, a portable data terminal, a personal computer, etc., connected to a communication network such as the Internet. This user terminal comprises sending/receiving unit 11, display unit 12, key entry unit 13, voice input unit 14, and storage unit 15.

The sending/receiving unit 11 sends or receives data to or from the server 20 over the communication network 30 that is wired or wireless. Data that is sent or received includes (1) data required to access the server 20, (2) web page data sent from the server 20, (3) data on a product or a service ordered through a web page, (4) signature request data sent from the server 20 in response to an order, (5) data required for a signature such as an order ID, name, order date/time, and (6) order acceptance data. The display unit 12 displays web pages sent from the server 20 or data output from the browser. The key entry unit 13 allows the user, through the key buttons (keyboard), to enter or select (order) a product or a service provided on the communication network 30 by the server 20. The voice input unit 14 allows the user to input, via voice, data necessary for a signature such as an order ID, name, order date/time, and so on, required by the server 20. The storage unit 15 stores data that is received and sent.

The server 20, a data processing unit such as a server, accepts a product or service request on the communication network 30. It comprises sending/receiving unit 21, allocating unit 22, storage unit 23, output unit 24, and checking unit 25.

The sending/receiving unit 21 sends or receives data to or from the user terminal 10 over the communication network 30. Data includes (1) web page data, (2) data on an order sent from the user terminal 10, (3) signature request data sent to the user terminal 10 such as an order ID, name, order date/time, and so on, (4) signature data sent from the user terminal 10 that is required for a signature such as an order ID, name, order date/time, and so on, and (5) order acceptance data. The allocating unit 22 allocates an order ID to an order sent from the user terminal 10. The storage unit 23 is used by the server 20 to store (save) received voice data composed of order data, an order ID, and a user signature that are received from the user (customer) and that are related to each other. The output unit 24 outputs data for executing processing when an order has been accepted. The checking unit 25 checks whether a plurality of voiceprints entered by a user as a signature match or whether the character-input contents match the voice-input contents.

The communication network 30 is a network, such as the Internet, that connects the user terminal 10 and the server 20. When the user terminal 10 is a cellular phone, the communication network 30 includes base stations.

Figure 2:
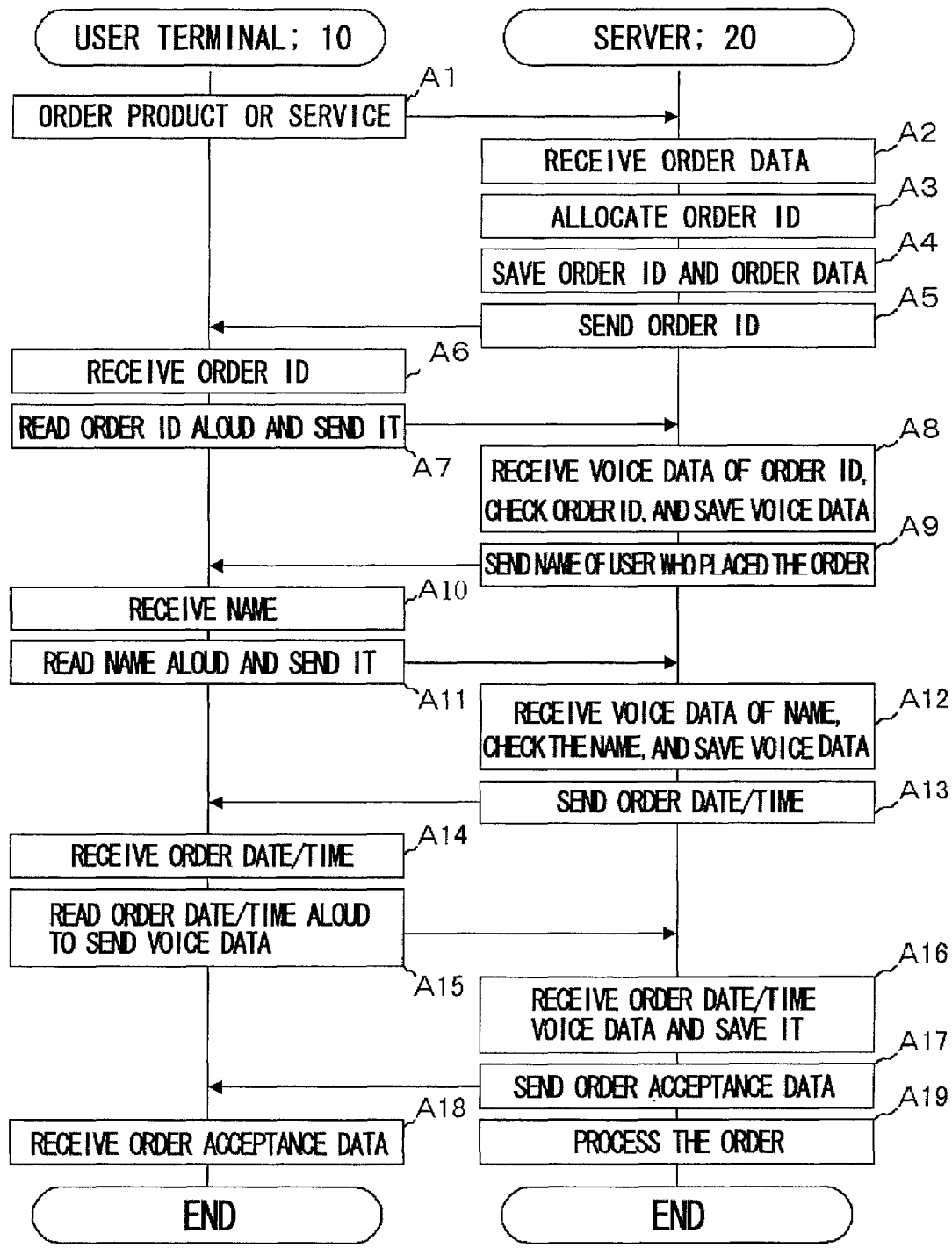
FIG. 2 is a flowchart showing the operation of the voice signature transaction system in the embodiment of the present invention.
Figure 3:
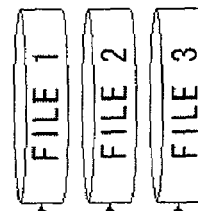
FIG. 3 is a diagram schematically showing the contents saved in a server of the voice signature transaction system in the embodiment of the present invention.

Next, the operation of the embodiment will be described with reference to the drawings. FIG. 2 is a flowchart showing the operation of a voice signature transaction system used in the embodiment of the present invention. FIG. 3 is a diagram schematically showing the contents that are saved in the server of the voice signature transaction system in the embodiment of the present invention. In the description described below, it is assumed that the user terminal 10 is a cellular phone and that the communication network 30 is the Internet.

Referring to FIG. 2, the user uses the cellular phone 10 to access a product/service order web page on the Internet 30 provided by the server 20. Then, the user specifies a product or a service through voice or keys and sends specified data (place an order) (step A1).

The server 20 receives order data from the user (customer) (step A2), allocates an order ID that uniquely identifies the received order data (step A3), and saves a combination of the order ID and the order data (step A4). The order data includes information on the product or service the user ordered as well as user identification information such as the user name, address, contact location, contact method, and so on (see order data in FIG. 3).

The server 20 sends the order ID, allocated to the user's order, to the cellular phone 10 via voice or screen display (step A5) and requests the user to enter the order ID as a signature via voice. For example, when '012345' is allocated as the order ID, the order ID '012345' is sent from the server 20 to the cellular phone 10 in step A5 as voice data or display data.

The user receives the order ID via the cellular phone 10 (step A6) and reads the order ID aloud to send the voice data of the order ID back to the server 20 (step A7). In step A7, the voice data read aloud by the user as 'zero one two three four five' is sent from the cellular phone 10 to the server 20 over the Internet 30.

In response to the voice data of the order ID from the cellular phone 10, the server 20 saves the voice data for later use as a part of the user's signature (step A8). This voice data is related to the saved order data before being saved. At this time, a check is made to see if the allocated order ID matches the order ID of the voice data. If they match, control is passed to the next step. If they do not match, the user is requested to send the voice data of the order ID again. If the allocated order ID does not match the order ID of the voice data after several attempts, the order is rejected.

The server 20 sends the name of the user, who placed the order, to the cellular phone 10 as voice data or display data (step A9) to request the user to enter the signature of the name via voice. For example, when the user name is 'Azuma Tomihiko', the name 'Azuma Tomihiko' is sent from the server 20 to the cellular phone 10 as display data in step A9. When the server 20 sends the name to the cellular phone 10 via voice in step A9, the pronounced name 'Azuma Tomihiko' is used.

When the user receives the name via the cellular phone 10 (step A10), he or she reads his or her own name aloud to send voice data of the name to the server 20 (step A11). In step A11, the pronounced voice data 'Azuma Tomihiko' is sent from the cellular phone 10 to the server 20 via the Internet 30.

In response to the voice data of the user name from the cellular phone 10, the server 20 saves the voice data for later use as a part of the user signature (step A12). This voice data is related to the order data in step A12 before being saved. In this step, a check is made to see if the name included in the order data matches the name included in the voice data. If they match, control is passed to the next step. If they do not match, the server 20 requests the user to send the voice data of the name again. If the name included in the order data does not match the name included in the voice data after several attempts, the order is rejected. Alternatively, a check may be made to see if the voiceprint of the voice data of the order ID matches the voiceprint of the voice data of the name. In this case, if the two voiceprints do not match, the order is rejected.

The server 20 sends the user order acceptance date/time to the cellular phone 10 as voice data or display data (step A13) to request the user to input the voice data of the order date/time as a signature. For example, when the order date/time is '32 minutes and 11 seconds past 8 on Mar. 6, 2000', the order date/time of '32 minutes and 11 seconds past 8 on Mar. 6, 2000' is sent from the server 20 to the cellular phone 10 as voice data or display data.

Upon receiving the order date/time by the cellular phone 10 (step A14), the user reads the order date/time aloud to send the voice data of the order date/time back to the server 20 (step A15). For example, in step A15, the voice data pronounced by the user as 'thirty-two minutes and eleven seconds past eight on March sixth two-thousand' is sent from the cellular phone 10 to the server 20 via the Internet 30.

In response to the voice data of the order date/time from the cellular phone 10, the server 20 saves the voice data for use as a part of the user signature (step A16). This voice data is related to the order data and is saved in step A16. In this step, a check may also be made to see if the voiceprint of the voice data of the order ID matches the voiceprint of the voice data of the date/time. In this case, if the two voiceprints do not match, the order is rejected.

When all data required for adding the signature to the order is obtained from the user and the obtained data is found valid, the server 20 sends voice data or display data to the cellular phone 10 indicating that the order from the user has been accepted (step A17) and starts processing the order from the user (step A19).

Upon receiving the voice data or display data via the cellular phone 10 indicating that the order has been accepted, the user learns that the order has been accepted correctly (step A18). Although the order ID, name, and order date/time are used as the user signature data in the above example, other data may also be used as the signature. Data that may be read aloud by the user via the cellular phone 10 may be used as signature data.

FIG. 3 is a diagram showing how order data is related to user signature data when saved. This order data indicates that '012345' is allocated as the order ID and that '100 binders' and '200 boxes of A4-size paper' are ordered from the user (customer) named 'Azuma Tomihiko'.

Order data and customer signature data are related by the order ID that uniquely identifies the order. The order ID, name, and order date/time are used as the signature data of the customer.

The order ID is saved as a combination of the character data '0123245', which represents the order ID, and 'file 1' which is the name of the file in which the voice data pronounced 'zero one two three four five' is stored.

The name is saved as a combination of the character data 'Azuma Tomihiko', which represents the name, and 'file 2' which is the name of the file in which the voice data pronounced 'Azuma Tomihiko' is stored.

The order date/time is saved as a combination of the character data '32 minutes and 11 seconds past 8 on Mar. 6, 2000', which represents the order date/time, and 'file 3' which is the name of the file in which the voice data pronounced 'thirty-two minutes and eleven seconds past eight on March sixth two-thousand' is stored.

If, after the server 20 processes the order, the user (customer) rejects to pay or does not recognize that he or she has placed the order, the server 20 reproduces the voice data in FIG. 3, saved as the user signature, to request the user to confirm the order. If the user still rejects to pay, the server 20 uses a voiceprint analyzer to analyze the voiceprint as necessary. If the result is suspicious, the server 20 asks a specialist to check the voiceprint of the voice data in FIG. 3 to prove that the user has placed the order and requests the user to pay.

The meritorious effects of the present invention are summarized as follows.

The system according to the present invention allows the user to add a signature to an order without having to install a special unit on the user terminal. The present invention is particularly useful in electronic commerce targeting rapidly spreading cellular phones or portable terminals, because a variety of phone types are available and a huge number of phones have already been shipped.

The reason is that voice is used as the method for adding a signature. A signature is produced by voice data generated by the user (customer) reading aloud the characters or numbers sent from the server. Therefore, any user terminal with a voice input mechanism, such as a cellular phone, could allow the user to add a signature. In addition, voice identifies individuals through voiceprint analysis and so on, making the signature highly reliable.

It should be noted that other objects, features and aspects of the present invention will become apparent in the entire disclosure and that modifications may be done without departing from the gist and scope of the present invention as disclosed herein and claimed as appended herewith.

Also it should be noted that any combination of the disclosed and/or claimed elements, matters and/or items may fall under the modifications aforementioned.

What is claimed is:

1. A voice signature transaction system comprising a user terminal used by a user, a server used by a person providing products or services, and a data network connecting the user terminal and the server for conducting a product or service transaction, said user terminal comprises a voice input unit for inputting voice data, and said server comprises a sending/receiving unit, an allocating unit, a storage unit, and a checking unit, wherein said sending/receiving unit being configured to:

sends product and service transaction information from said server to said user terminal when accessed by said user terminal, receives, from said user terminal, order data including data on a product or a service and a user name, said product or service being specified from products and services included in the transaction information, sends, from said server, order ID request information to said user terminal, said order ID request information requesting a voice signature of an order ID of the order data, said order ID being allocated by said allocating unit in response to the order data, receives, by said server, first voice data that includes order ID voice data that is input, via voice, on said user terminal receiving the order ID request information, wherein the first voice data includes the voice signature of the order ID of the order data, sends, from said server, name request information to said user terminal when the order ID included in the first voice data matches the allocated order ID, said name request information requesting to input, via voice, a voice signature of a name of a user who has placed the order, receives, by said server, second voice data that includes name voice data that is input, via voice, on said user terminal receiving the name request information, wherein the second voice data includes the voice signature of the name of the user who has placed the order, and sends, from said server, acceptance information to said user terminal when the name included in the second voice data matches the name included in the order data, said acceptance information indicating that the order data, the first voice data, and the second voice data have been accepted;

said allocating unit being configured to allocate the order ID to the order data, said storage unit being configured to store the order data, the first voice data, the second voice data, and the transaction information and said checking unit being configured to:

checks if the order ID included in the first voice data received by said server matches the allocated order ID, and checks if the name included in the second voice data received by said server matches the name included in the order data, wherein, in a case in which said user of said user terminal denies payment of an order corresponding to the order ID, said server compares, by way of a voice recognition procedure, third voice data output from said user terminal when denial of payment was made after the order had been made and accepted by said server, with the first voice data and the second voice data, and wherein the user is determined to either have made or not have made the order corresponding to the order ID based on whether or not the voice recognition procedure performed by said server determines that the first voice data, the second voice data and the third voice data are from a same user.

2. The voice signature transaction system as defined by claim 1 wherein the sending/receiving unit of said server further sends date/time request information to said user terminal when the name included in the second voice data matches the name included in the order data, said date/time request information requesting to input, via voice, an order date/time, and receives date/time voice data that is input, via voice, on said user terminal receiving the date/time request information, and the storage unit of said server further stores the date/time voice data related to the order data.

3. The voice signature transaction system as defined by claim 2 wherein the checking unit of said server further checks if a voiceprint of the first voice data matches a voiceprint of the second voice data and/or date/time voice data, and the sending/receiving unit of said server further sends the acceptance information to said user terminal when the voiceprint of the first voice data matches the voiceprint of the second voice data and/or date/time voice data.

4. The voice signature transaction system as defined in claim 2, wherein a combination of said date/time voice data, said first voice data, and said second voice data are stored together in said storage unit of said server as signature data corresponding to said order ID.

5. The voice signature transaction system as defined by claim 1 wherein the checking unit of said server further checks if a voiceprint of the first voice data matches a voiceprint of the second voice data and/or date/time voice data, and the sending/receiving unit of said server further sends the acceptance information to said user terminal when the voiceprint of the first voice data matches the voiceprint of the second voice data and/or date/time voice data.

6. The voice signature transaction system as defined by claim 1 wherein the sending/receiving unit of said server sends the order ID request information or the name request information again when the checking unit did not find a match in the order IDs, in the names, or in the voiceprints, and information indicating that the order data is not accepted when the checking unit did not find a match in the order IDs, in the names, or in the voiceprints after the order ID request information or the name request information is sent a specified number of times.

7. The voice signature transaction system as defined by claim 1, wherein said server further comprises an output unit for outputting a voice of the first and second voice data stored in the storage unit.

8. The voice signature transaction system as defined by claim 1, wherein said user terminal is a cellular phone and wherein said data network includes a wireless base station capable of making a wireless connection to the cellular phone.

9. The voice signature transaction system as defined in claim 1, wherein, in the case in which said user denies payment of the order corresponding to the order ID at the later point in time, said server requests a voice recognition specialist to compare the first voice data and the second voice data, and if the first voice data and the second voice data match as determined by the voice recognition specialist, the user is requested by said server to pay for the order.

10. The voice signature transaction system as defined in claim 9, wherein the voice recognition specialist is a human being.

11. A voice signature transaction method for use in a system comprising a user terminal used by a user, a server used by a person providing products or services, and a data network connecting the user terminal and the server for conducting a product or service transaction, said method comprising the steps by said server of:

(a) sending, from said server, product and service transaction information to said user terminal when accessed by said user terminal;

(b) receiving, by said server, order data including data on a product or a service and a user name, said product or service being specified on said user terminal receiving the transaction information and being specified from products and services included in the transaction information;

(c) storing, by said server, the received order data;

(d) allocating, by said server, an order ID to the order data in response to receiving the order data;

(e) sending, from said server, order ID request information to said user terminal, said order ID request information requesting, via voice, a voice signature of the order ID of the order data;

(f) receiving, by said server, first voice data that includes order ID voice data that is input, via voice, on said user terminal receiving the order ID request information;

(g) storing, by said server, the first voice data related to the order data;

(h) checking, by said server, if the first voice data received by said server matches the allocated order ID;

(i) sending, by said server, name request information to said user terminal when the order ID included in the first voice data matches the allocated order ID, the name request information requesting to input, via voice, a voice signature of a name of a user who has placed the order;

(j) receiving, by said server, second voice data that includes name voice data that is input, via voice, on said user terminal receiving the name request information;

(k) checking, by said server, if the name included in the second voice data received by said server matches the name included in the order data;

(l) sending, by said server, acceptance information to said user terminal when the name included in the second voice data matches the name included in the order data, said acceptance information indicating that the order data, the first voice data, and the second voice data have been accepted;

(m) denying, by the user at said user terminal, payment of an order corresponding to the order ID after the order ID has been accepted, the denying being performed by way of third voice data output from said user terminal after the order has been made from said user terminal and accepted by said server;

(n) comparing by said server, by way of a voice recognition procedure performed by said server, the third voice data with the first and second voice data, to determine if the first voice data, the second voice data and the third voice data are from a same person; and (o) based on the comparing step, determining by said server whether the user had made or had not made the order corresponding to the order ID based on whether or not the voice recognition procedure determines that the first voice data, the second voice data and the third voice data are from the same user.

12. The voice signature transaction method as defined by claim 11, further comprising the steps, before the acceptance information is sent said user terminal, by said server of:

(p) sending date/time request information to said user terminal when the name included in the second voice data matches the name included in the order data, said date/time request information requesting to input, via voice, an order date/time;

(q) receiving date/time voice data that is input, via voice, on said user terminal receiving the date/time request information; and (r) storing the date/time voice data related to the order data.

13. The voice signature transaction method as defined by claim 11, further comprising the steps by said server of:

(p) checking if a voiceprint of the first voice data matches a voiceprint of the second voice data and/or date/time voice data, and (q) sending the acceptance information to said user terminal when the voiceprint of the first voice data matches the voiceprint of the second voice data and/or date/time voice data.

14. The voice signature transaction method as defined by claim 12, further comprising the steps by said server of:

(s) checking if a voiceprint of the first voice data matches a voiceprint of the second voice data and/or date/time voice data, and (t) sending the acceptance information to said user terminal when the voiceprint of the first voice data matches the voiceprint of the second voice data and/or date/time voice data.

15. The voice signature transaction method as defined in claim 13, wherein a combination of said date/time voice data, said first voice data, and said second voice data are stored together in said storage unit of said server as signature data corresponding to said order ID.

16. The voice signature transaction method as defined by claim 11, further comprising the steps by said server of:

(n) sending the order ID request information or the name request information again when the checking unit did not find a match in the order IDs, in the names, or in the voiceprints, and (o) sending information indicating that the order data is not accepted when the checking unit did not find a match in the order IDs, in the names, or in the voiceprints after the order ID request information or the name request information is sent a specified number of times.

17. The voice signature transaction method as defined by claim 11, further comprising the step by said server of outputting a voice of the stored first and second voice data.

18. The voice signature transaction method as defined by claim 11, wherein said user terminal is a cellular phone and wherein said data network includes a wireless base station capable of making a wireless connection to the cellular phone.

19. A computer-readable medium that has stored therewithin a computer-readable program for use in a system comprising a user terminal used by a user, a server used by a person providing products or services, and a data network connecting the user terminal and the server for conducting a product or service transaction, said program causing said server to perform the steps of:

sending, by said server, product and service transaction information to said user terminal when accessed by said user terminal;

receiving, by said server, order data including data on a product or a service and a user name, said product or service being specified on said user terminal receiving the transaction information and being specified from products and services included in the transaction information;

storing, by said server, the received order data;

allocating, by said server, an order ID to the order data in response to receiving the order data;

sending, from said server, order ID request information to said user terminal, said order ID request information requesting, via voice, a voice signature of the order ID of the order data;

receiving, by said server, first voice data that includes order ID voice data that is input, via voice, on said user terminal receiving the order ID request information;

storing, by said server, first voice data related to the order data;

checking, by said server, if the first voice ID voice data received by said server matches the allocated order ID;

sending, from said server, name request information to said user terminal when the order ID included in the first voice data matches the allocated order ID, the name request information requesting to input, via voice, a voice signature of a name of a user who has placed the order;

receiving, by said server, second voice data that includes name voice data that is input, via voice, on said user terminal receiving the name request information;

checking, by said server, if the name included in the second voice data received by said server matches the name included in the order data;

sending, from said server, acceptance information to said user terminal when the name included in the second voice data matches the name included in the order data, said acceptance information indicating that the order data, the first voice data, and the second voice data have been accepted;

denying payment, by the user at said user terminal, of an order corresponding to the order ID after the order ID has been accepted, the denying being performed by way of third voice data output from said user terminal after the order has been made from said user terminal and accepted by said server;

comparing, by way of a voice recognition procedure performed by said server, said third voice data with said first and second voice data, to determine if the first voice data, the second voice data and the third voice data are from a same person; and based on the comparing step, determining by said server whether the user had made or had not have made the order corresponding to the order ID based on whether or not the voice recognition procedure determines that the first voice data, the second voice data and the third voice data are from the same user.

20. The computer-readable medium as defined by claim 19, wherein, before the acceptance information is sent said user terminal, said program further causes said server to perform the steps of:

sending date/time request information to said user terminal when the name included in second voice data matches the name included in the order data, said date/time request information requesting to input, via voice, an order date/time;

receiving date/time voice data that is input, via voice, on said user terminal receiving the date/time request information; and storing the date/time voice data related to the order data.

21. The computer-readable medium as defined by claim 20, wherein said program further causes said server to perform the steps of:

checking if a voiceprint of the first voice data matches a voiceprint of the second voice data and/or date/time voice data, and sending the acceptance information to said user terminal when the voiceprint of the first voice data matches the voiceprint of the second voice data and/or date/time voice data.

22. The computer-readable medium as defined by claim 19, wherein said program further causes said server to perform the steps of:

checking if a voiceprint of the first voice data matches a voiceprint of the second voice data and/or date/time voice data, and sending the acceptance information to said user terminal when the voiceprint of the first voice data matches the voiceprint of the second voice data and/or date/time voice data.

23. The computer-readable medium as defined by claim 19, wherein said program further causes said server to perform the steps of:

sending the order ID request information or the name request information again when the checking unit did not find a match in the order IDs, in the names, or in the voiceprints, and sending information indicating that the order data is not accepted when the checking unit did not find a match in the order IDs, in the names, or in the voiceprints after the order ID request information or the name request information is sent a specified number of times.

24. The computer-readable medium as defined by claim 19, wherein said program further causes said server to output a voice of the stored voice data.

25. The computer-readable medium as defined by claim 19, wherein said user terminal is a cellular phone and wherein said data network includes a wireless base station capable of making a wireless connection to the cellular phone.

* * * * *